United States Patent [19]

Mikami

[11] Patent Number: 4,467,882

[45] Date of Patent: Aug. 28, 1984

[54] AUTOMATIC WEIGHING APPARATUS

[75] Inventor: Yoshiharu Mikami, Kyoto, Japan

[73] Assignee: Kabushiki Kaisha Ishida Koki Seisakusho, Kyoto, Japan

[21] Appl. No.: 421,439

[22] Filed: Sep. 22, 1982

[30] Foreign Application Priority Data

Sep. 24, 1981 [JP] Japan ................. 56-142237

[51] Int. Cl.³ ............... G01G 21/28; G01G 21/23
[52] U.S. Cl. ................................ 177/58; 177/128
[58] Field of Search ............. 177/25, 58, 128, 211

[56] References Cited

U.S. PATENT DOCUMENTS

| | | | |
|---|---|---|---|
| 3,108,647 | 10/1963 | Harmon et al. | 177/58 X |
| 4,313,507 | 2/1982 | Hays | 177/25 X |
| 4,332,174 | 6/1982 | Suzuki et al. | 177/211 X |
| 4,344,492 | 8/1982 | Hirano | 177/25 |
| 4,398,612 | 8/1983 | Mikami et al. | 177/58 X |

*Primary Examiner*—George H. Miller, Jr.
*Attorney, Agent, or Firm*—Staas & Halsey

[57] ABSTRACT

Disclosed is an automatic weighing apparatus in which a plurality of weighing mechanisms, each having a load cell composed of a strain gauge attached to the upper and lower beams of a rectangular main body, are arrayed on the circumference of a circle concentric with the weighing apparatus, each weighing mechanism being operatively associated with a correspnoding weighing hopper for receiving articles to be weighed. Each weighing mechanism is so arranged that the beams of the load cell lie parallel with a tangent line drawn to the circumference of the circle at the location of the mechanism, whereby the load cell can be inspected and repaired with facility and the overall apparatus reduced in size.

9 Claims, 6 Drawing Figures

AUTOMATIC WEIGHING APPARATUS

BACKGROUND OF THE INVENTION

This invention relates to the construction of an automatic weighing apparatus of the type having a circular array of plural weighing mechanisms each of which comprises a load cell. More particularly, the invention relates to the construction of an automatic weighing apparatus in which the load cells can be inspected and repaired with facility.

Of the types of automatic weighing apparatus which are now available, some include a plurality of weighing mechanisms rather than just a single weighing mechanism. One example is referred to as a combination computing type automatic weighing apparatus which weighs out articles by selecting a combination of the weighing mechanisms that gives a total weight closest to a preset target weight, and then discharging the articles from the weighing hoppers corresponding to the selected weighing mechanisms, whereby the weight of the discharged articles will be closest to the target weight.

FIG. 1 is a top plan view illustrating such an automatic weighing apparatus, and FIG. 2 is a side view of the same. In this automatic weighing apparatus, a plurality of weighing hoppers 2 are mounted in a circular array above the circumference of the top opening of a collecting chute 1. Each weighing hopper 2 is operatively associated with a weighing mechanism 3 designed to weigh out articles contained in the weighing hopper 2. A distribution table 4 is supported on an electromagnetically operated vibrator 5 for supply troughs 6 and is set into helical reciprocating rotation. The supply troughs 6 are mounted radially on the outer periphery of the distribution table 4 and are vibrated by corresponding electromagnetic vibrators 7. Sensors 8 are used for optically sensing the quantity of the articles on the distribution table 4. A pool hopper 9 is provided between each weighing hopper 2 and the supply trough associated therewith. Each weighing hopper 2 and the pool hopper 9 associated therewith are provided with a drive unit 12 and levers 10, 11 adapted for opening and closing the hoppers 2, 9.

The computerized combinatorial weighing apparatus thus constructed operates as follows.

The articles are supplied from the distribution table 4 through supply troughs 6 into pool hoppers 9 and thence into weighing hoppers 2. The articles thus received in the weighing hoppers 2 are weighed by the weighing mechanisms 3 associated therewith. Based on the weights measured by the weighing mechanisms 3, a control unit, not shown, of the weighing apparatus performs a combinatorial weighing operation by comparing the result of each combinatorial adding operation performed on the article weights with a preset target weight and selecting the combination of articles, known as the best combination, that gives a total weight equal to the target weight or closest to the target weight. In this case, the number of articles in the combination may be arbitrary or predetermined, as desired. The control unit then operates to open the thus selected weighing hoppers 2 by the operation of the levers 10, 11 so that the articles giving said best combination are released into the collecting chute 1 from the weighing hoppers 2 to be discharged towards a packaging machine or a bucket conveyor, not shown. This will leave the selected weighing hoppers 2 empty. Articles are then newly delivered from the corresponding pool hoppers 9 into said weighing hoppers 2, leaving these pool hoppers 9 empty, whereupon a new supply of articles is delivered from the distribution table 4 and the corresponding supply troughs 6. The weighing operation can be continued in this manner by repeating the foregoing steps.

Each of the weighing mechanisms 3 in the above-described automatic weighing apparatus employ weighing means that rely upon compact, highly accurate load cells. Each load cell includes a strain gauge affixed to the upper and lower beams of a rectangular frame, and is adapted to weigh articles by relying upon a variation in the resistance of the strain gauge caused by a load applied to a load receiving member. With the conventional automatic weighing apparatus, the weighing mechanisms 3 are arrayed in radiating fashion so that the beams of the load cells lie along radial lines pointing to the center of the apparatus, as illustrated in FIG. 3 which is a simplified top view of the apparatus of FIG. 2 as it would appear if viewed along the line I—I with all but the weighing mechanisms 3 removed. As a result, a great amount of space is required for the installation of the weighing mechanisms, and both inspection and repair of the load cells are laborious tasks since the operator must perform the necessary work between adjacent ones of the weight mechanisms 3 where the available space is so small.

SUMMARY OF THE INVENTION

Accordingly, an object of the present invention is to provide an automatic weighing apparatus wherein the load cells of the weighing mechanisms constituting the apparatus can be inspected and repaired with facility from the outside of the apparatus.

Another object of the present invention is to provide an automatic weighing apparatus wherein the weighing mechanisms constituting the apparatus are not installed along radial lines so that the space required for installation may be reduced.

A further object of the present invention is to provide an automatic weighing apparatus the overall size whereof may be reduced.

Other features and advantages of the invention will be apparent from the following description taken in connection with the accompanying drawings.

DESCRIPTION OF THE PREFERRED EMBODIMENT

Figure 4:
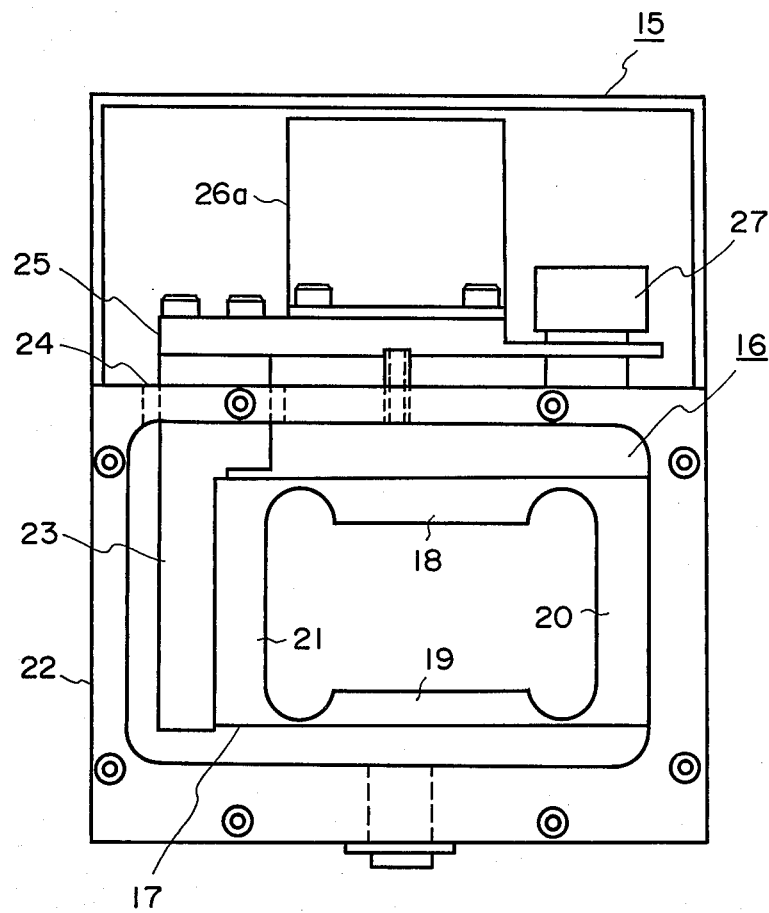
FIG. 4 is a front view illustrating an embodiment of a weighing mechanism according to the present invention.
Figure 5:
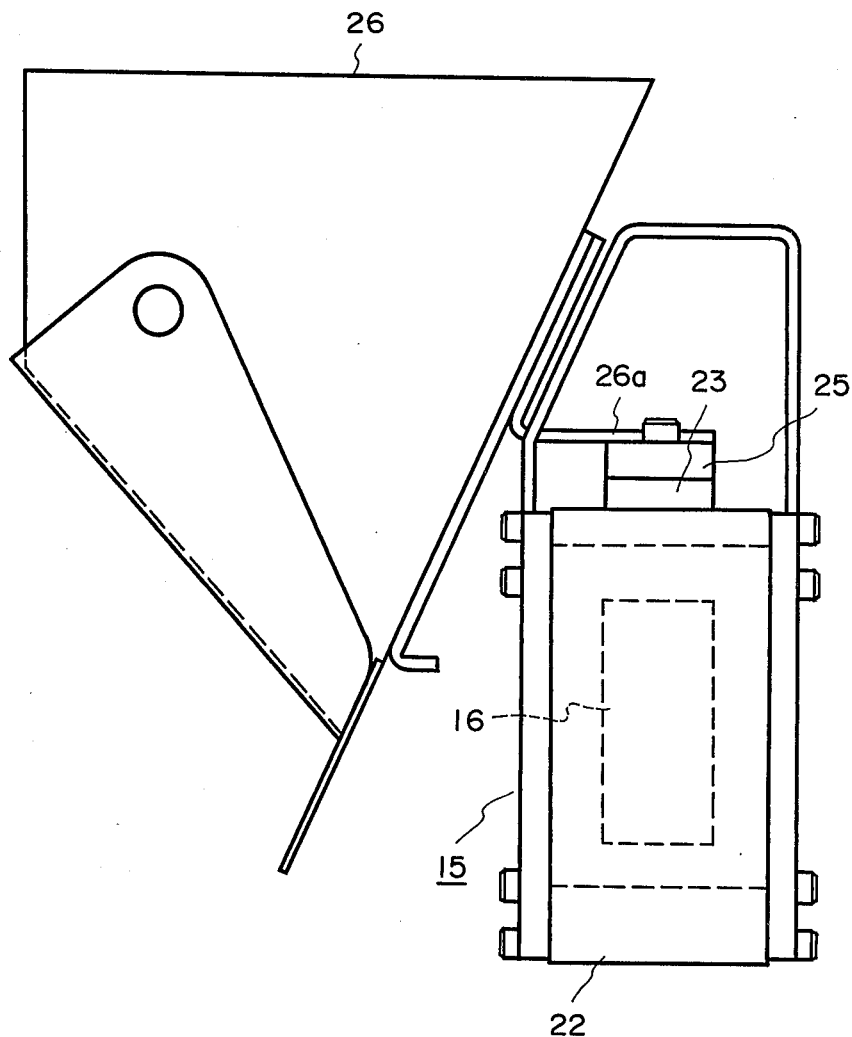
FIG. 5 is a side elevation of the weighing mechanism shown in FIG. 4.

Reference will first be had to FIGS. 4 and 5 for a detailed description of a preferred embodiment of the present invention.

A weighing mechanism 15 in accordance with the present invention includes a load cell 16 having a rectangularly shaped main body 17 which includes upper and lower beams 18, 19, and a strain gauge, not shown, attached to the inner faces of the beams 18, 19. The load cell 16 also has a base 20 and a load receiving portion 21. A rectangular support frame 22 is provided to support the load cell 16. Specifically, the load cell 16 is disposed within the support frame 22 and has its base 20 bolted or otherwise secured to the lateral side surface of the support frame 22. The beams 18, 19 and the load receiving portion of the cell are left free. A support column 23 is affixed to the load receiving portion 21 of the load cell 16 and has an upper end portion which penetrates from the upper side of the support frame 22 through a hole 24 formed in the support frame. A weighing hopper 26 (FIG. 5) for weighing articles supplied thereto has a mounting fitting 26a secured thereto for fixedly mounting the weighing hopper 26 on the upper end of the column 23 by means of a bracket 25. Numeral 27 denotes a weight for the span adjustment of the load cell 16.

According to a feature of the present invention, the arrangement is such that the longitudinal axes of the beams 18, 19, extending longitudinally of the load cell 16, lie parallel to the weighing hopper 26.

In the operation of the weighing mechanism 15, a load applied to the weighing hopper 26 by the weight of articles charged into the hopper is transmitted to the load receiving portion 21 of the load cell 16 through the fitting 26a, bracket 25 and support column 23. As the load is transmitted to the load receiving portion 21 and thence to the upper and lower beams 18, 19, the strain gauge attached to the beams undergoes a change in resistance commensurate with the applied load, allowing the load, namely the weight of the articles, to be detected electrically.

Figure 1:
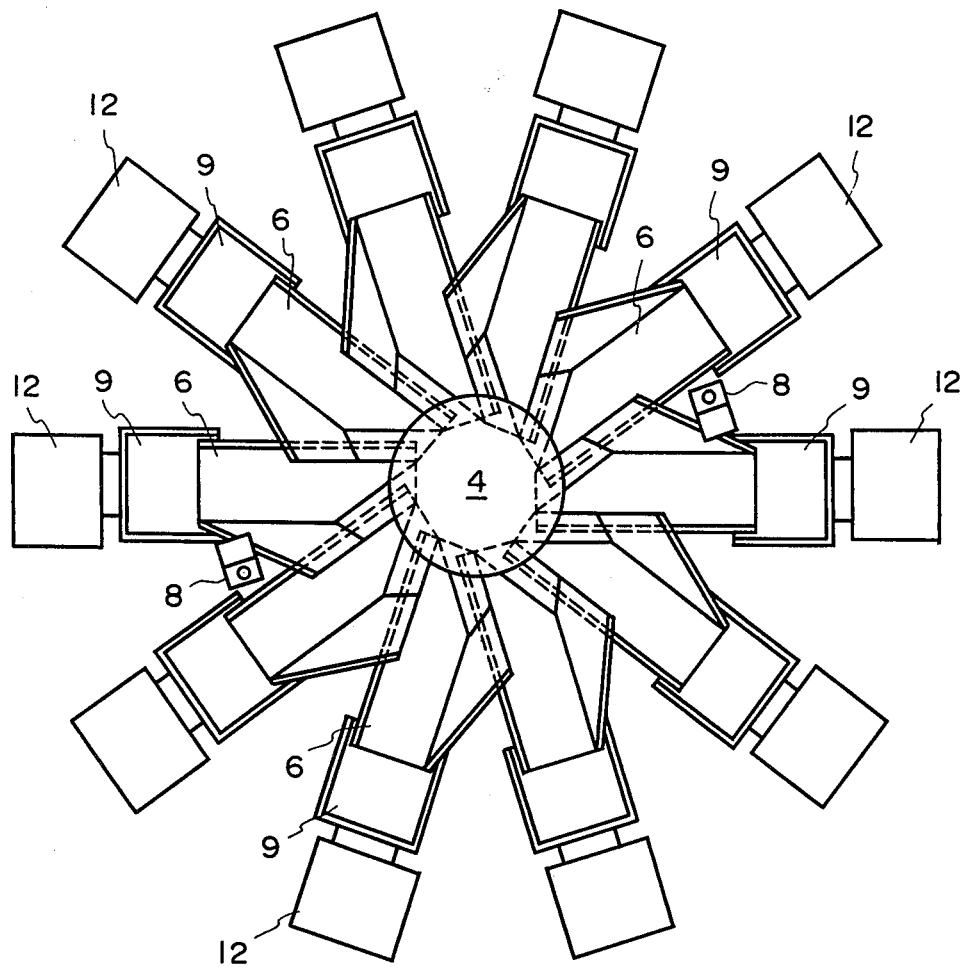
FIG. 1 is a top plan view illustrating an example of an automatic weighing apparatus to which the present invention can be applied.
Figure 2:
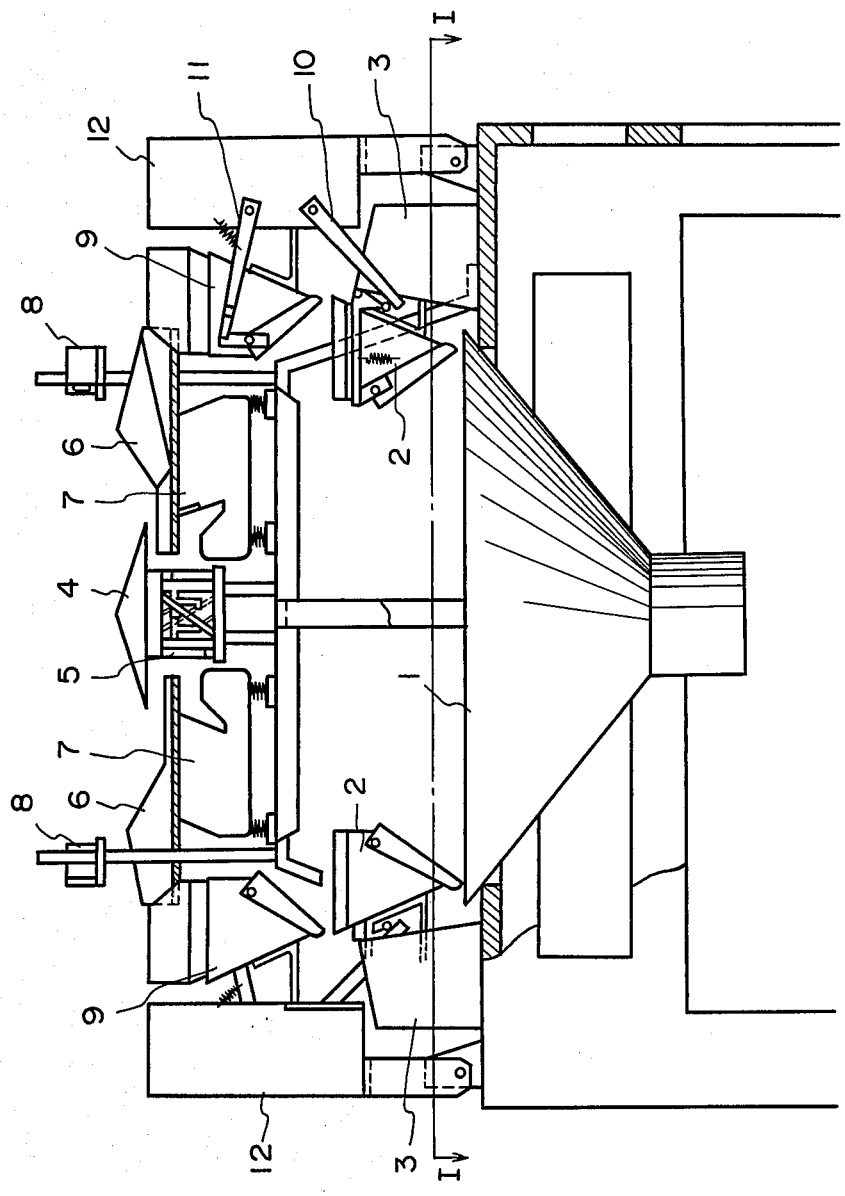
FIG. 2 is a sectional view of the automatic weighing apparatus shown in FIG. 1.
Figure 3:
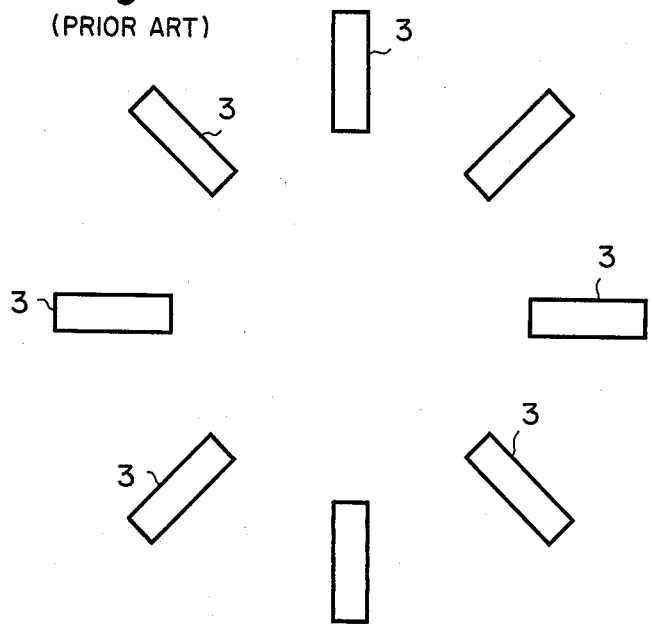
FIG. 3 is a simplified top view showing the arrangement of weighing mechanisms in an automatic weighing apparatus according to the prior art.
Figure 6:
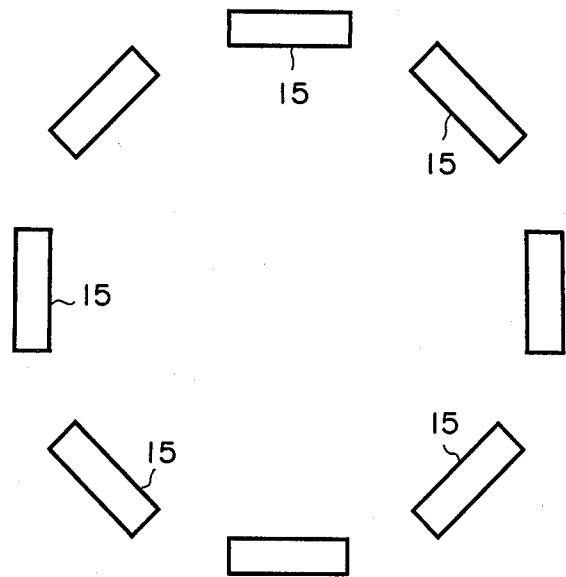
FIG. 6 is a top view showing the arrangement of weighing mechanisms in an automatic weighing apparatus according to the present invention.

The arrangement of the weighing mechanisms in an automatic weighing apparatus according to the present invention is illustrated in FIG. 6. A multiplicity of the weighing mechanisms 15 are arrayed on the circumference of a circle concentric with the center of the weighing apparatus, with the upper and lower beams 18, 19 of each incorporated load cell lying parallel with a line drawn tangent to the circle at the location of each cell. Although not shown, an article supply mechanism, which may comprise the distribution table, supply troughs and pool hoppers illustrated in FIG. 2, is provided above the weighing hopper 26 supported on the weighing mechanism 15, and an article discharge apparatus, comprising a collecting chute and timing hopper, is provided below the weighing hopper 26. Articles supplied to the weighing hopper 26 are weighed by the weighing mechanism 15, combinations are computed based on the obtained weight values, the combination of weighing hoppers that gives a total weight equal or closest to a preset target weight is selected, and the selected weighing hoppers are caused to discharge their articles.

Since the weighing mechanisms 15 of the automatic weighing apparatus according to the invention are so arrayed as to lie parallel with the respective tangent lines drawn to the circumference of the circle on which the weighing mechanisms are disposed, the load cells incorporated within the weighing mechanisms can be inspected and repaired with facility by a technician as he faces each weighing mechanism from the outside of the weighing apparatus.

The present invention is not limited solely to a combination computing-type automatic weighing apparatus, but may also be applied to a combination computing-type automatic counting apparatus which, having a plurality of weighing mechanisms, operates by dividing the weight of articles in each weighing mechanism by the average unit weight of each individual article to find the number of articles in the weighing hopper of each weighing mechanism, computing combinations of the numbers of articles, selecting the combination of weighing mechanisms whose weighing hoppers will give a total weight equal or closest to a preset target number, and discharging the articles from the weighing hoppers of the selected weighing mechanisms. The invention is not limited to the combination computing-type apparatus, but can be applied to any weighing apparatus that has a plurality of weighing mechanisms arranged to form a group, wherein the weighing mechanisms execute weighing independently of one another.

According to the present invention as described hereinabove, the weighing mechanisms are arranged so as to lie in parallel with respective tangent lines drawn to the circumference of the circle on which the weighing mechanisms are arrayed. Such an arrangement facilitates inspection and repair and enhances operability. In addition, less installation space is required since the weighing mechanisms do not project from the weighing apparatus along radial lines.

Since various changes can be made within the scope of the invention, it is obvious that the present invention is not limited to the details as set forth and may cover any changes as may come within the scope of the following claims.

What I claim is:

1. An automatic weighing apparatus which comprises a plurality of weighing hoppers for receiving articles to be weighed, and a plurality of weighing mechanisms operatively associated with respective ones of said weighing hoppers for weighing the articles received in said weighing hoppers, each of said weighing mechanisms including a load cell having a rectangular main body, upper and lower beams of said main body, a base joining said upper and lower beams at one end, a load receiving portion joining said upper and lower beams at the other end, and a strain gauge attached to said upper and lower beams, each of said weighing mechanisms being arrayed on the circumference of a circle concentric with the weighing apparatus and so arranged that the upper and lower beams of said load cell lie parallel with a tangent line drawn to the circumference of the circle at the location of said weighing mechanism.

2. An automatic weighing apparatus according to claim 1, in which each of said weighing hoppers includes a mounting fitting for connecting the weighing hopper to a corresponding one of said weighing mechanisms, said mounting fitting being secured to said corresponding weighing mechanism so as to lie at right angles to said upper and lower beams.

3. An automatic weighing apparatus according to claim 1, in which each of said weighing mechanisms further includes a support frame to which said base of said load cell is affixed for accommodating said load cell therewithin.

4. An automatic weighing apparatus according to claim 3, in which each of said weighing mechanisms further includes a support column affixed to said load receiving portion of said load cell for transmitting a load from the corresponding weighing hopper to said load cell.

5. An automatic weighing apparatus according to claim 4, in which each of said weighing hoppers includes a mounting fitting secured thereto, and each of said weighing mechanisms further includes a bracket connected to said mounting fitting and secured to said support column.

6. An automatic weighing apparatus according to claim 5, in which said mounting fitting is secured to said bracket so as to lie at right angles to said upper and lower beams.

7. An automatic weighing apparatus according to claim 1, in which a supply mechanism is provided above said weighing hoppers to supply said weighing hoppers with articles to be weighed.

8. An automatic weighing apparatus according to claim 7, in which said supply mechanism includes pool hoppers operatively associated with corresponding ones of said weighing hoppers for temporarily storing articles to be weighed, supply troughs operatively associated with corresponding ones of said pool hoppers for supplying said pool hoppers with said articles to be weighed, and a distribution table for distributing said articles among each of said supply troughs.

9. An automatic weighing apparatus according to claim 7, in which a collecting chute is provided below said weighing hoppers for collecting articles discharged thereby.

* * * * *